United States Patent
Bucur et al.

(10) Patent No.: US 10,559,817 B2
(45) Date of Patent: Feb. 11, 2020

(54) SULFUR PARTICLES COATED WITH INORGANIC-ORGANIC HYBRID MEMBRANES AS CATHODE ACTIVE MATERIAL AND BATTERIES CONTAINING THE PARTICLES

(71) Applicant: Toyota Motor Engineering & Manufacturing North America, Inc., Erlanger, KY (US)

(72) Inventors: Claudiu B. Bucur, Ypsilanti, MI (US); John Muldoon, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 393 days.

(21) Appl. No.: 15/422,032

(22) Filed: Feb. 1, 2017

(65) Prior Publication Data

US 2018/0219215 A1 Aug. 2, 2018

(51) Int. Cl.

| | |
|---|---|
| *H01M 4/36* | (2006.01) |
| *H01M 4/38* | (2006.01) |
| *H01M 4/62* | (2006.01) |
| *H01M 4/60* | (2006.01) |
| *H01M 4/58* | (2010.01) |
| *H01M 10/052* | (2010.01) |
| *H01M 4/139* | (2010.01) |
| *B82Y 30/00* | (2011.01) |
| *B82Y 40/00* | (2011.01) |
| *H01M 4/13* | (2010.01) |
| *H01M 4/02* | (2006.01) |

(52) U.S. Cl.
CPC ............ *H01M 4/366* (2013.01); *B82Y 30/00* (2013.01); *B82Y 40/00* (2013.01); *H01M 4/13* (2013.01); *H01M 4/139* (2013.01); *H01M 4/362* (2013.01); *H01M 4/38* (2013.01); *H01M 4/382* (2013.01); *H01M 4/58* (2013.01); *H01M 4/604* (2013.01); *H01M 4/62* (2013.01); *H01M 4/622* (2013.01); *H01M 4/623* (2013.01); *H01M 10/052* (2013.01); *H01M 4/625* (2013.01); *H01M 2004/021* (2013.01); *H01M 2004/028* (2013.01)

(58) Field of Classification Search
CPC .......... H01M 4/366; H01M 4/38; H01M 4/62; H01M 4/13; H01M 4/139; H01M 4/622; H01M 4/623; H01M 4/625; H01M 4/382; H01M 4/58; H01M 4/362; H01M 4/604; H01M 10/052; H01M 2004/028; H01M 2004/021; B82Y 40/00; B82Y 30/00
See application file for complete search history.

(56) References Cited

U.S. PATENT DOCUMENTS

| | | | |
|---|---|---|---|
| 8,252,461 B2 | 8/2012 | Vu et al. | |
| 9,211,505 B2 | 12/2015 | Gonon et al. | |
| 9,455,447 B2 | 9/2016 | Thillaiyan et al. | |
| 2006/0257728 A1 | 11/2006 | Mortensen et al. | |
| 2012/0052397 A1 | 3/2012 | Mikhaylik et al. | |
| 2014/0234707 A1* | 8/2014 | Muldoon | H01M 4/366 429/211 |
| 2015/0084603 A1 | 3/2015 | Thillaiyan et al. | |
| 2015/0236367 A1 | 8/2015 | Kim et al. | |
| 2015/0270520 A1 | 9/2015 | Stokes et al. | |
| 2015/0328927 A1 | 11/2015 | Grunlan et al. | |
| 2016/0107192 A1 | 4/2016 | Grunlan et al. | |
| 2016/0114294 A1 | 4/2016 | Grunlan et al. | |
| 2018/0123133 A1* | 5/2018 | Muldoon | H01M 4/366 |

OTHER PUBLICATIONS

Kumar et al., "Effect of Type and Content of Modified Montmorillonite on the Structure and Properties of Bio-Nanocomposite Films Based on Soy Protein Isolate and Montmorillonite", Journal of Food Science 75(5):N46-N56 (2010).
Science Direct I Science Direct Topics, "Polyelectrolyte—an overview", pp. 1-11.
Bailey et al, "Smectite clay—inorganic nanoparticle mixed suspensions: phase behaviour and rheology", Soft Matter 11:222-236(2015).
Laufer et al., "Clay—Chitosan Nanobrick Walls: Completely Renewable Gas Barrier and Flame-Retardant Nanocoatings", ACS Appl. Mater. Interfaces 4:1643-1649 (2012).

* cited by examiner

*Primary Examiner* — Laura Weiner
(74) *Attorney, Agent, or Firm* — Oblon, McClelland, Maier & Neustadt, L.L.P.

(57) ABSTRACT

A core-shell composite sulfur particle containing a core of elemental sulfur having homogeneously dispersed particles of a conductive carbon and a polyelectrolyte polymer; and a shell containing a hybrid membrane coating of branched polyethyleneimine (bPEI) on the core and at least one sequential set of a negatively charged clay nanosheet and a further coating of bPEI encapsulating the core is provided. In the sulfur particle the dispersed particles of conductive carbon are associated with the polyelectrolyte polymer. A cathode having an active material containing the core-shell composite sulfur particle and a sulfur loading of 1.0 mg S/cm$^2$ to 10 mg/cm$^2$ and a battery containing the cathode are also provided.

20 Claims, 6 Drawing Sheets

SULFUR PARTICLES COATED WITH INORGANIC-ORGANIC HYBRID MEMBRANES AS CATHODE ACTIVE MATERIAL AND BATTERIES CONTAINING THE PARTICLES

BACKGROUND

Field of the Disclosure

This disclosure is directed to sulfur particles embedded with conductive carbon and a cathode active material containing sulfur particles which can be suitable for producing cathodes of high sulfur areal loading. Thus the present disclosure is also directed to a cathode having a high areal sulfur loading for a metal ion battery and a metal ion battery containing the cathode.

Discussion of the Background

An ongoing objective in the commercial development of electric vehicles and portable electronics is to provide batteries with higher energy densities than currently available with state of the art lithium ion batteries. One approach in achievement of this objective is to couple a metal anode, such as lithium or magnesium, with a high capacity conversion cathode, such as sulfur or oxygen, without sacrificing cycle life and rate capability. Sulfur is highly attractive because it is economical, highly abundant and offers a charge capacity that is an order of magnitude higher than conventional insertion lithium ion cathodes. However, sulfur is electrically insulating and exhibits unacceptably high mass loss during cycling due to the formation of polysulfide reduction intermediates which are highly soluble in an electrolyte and do not return to the cathode during a recharge cycle.

Thus, although elemental sulfur has been under investigation as a cathode active material in conjunction with metal anodes for more than 50 years, in order to obtain a viable commercial sulfur cathode energy storage and supply source, these two fundamental challenges must be overcome. The first challenge is to enhance the conductivity of elemental sulfur. Unlike commercial lithium ion cathodes containing $LiCoO_2$ which possess a high electronic conductivity and do not require significant addition of conductive additives, sulfur is an effective insulator which is 1 billion times less conductive than $LiCoO_2$. Therefore, in order to prepare a viable and commercially useful battery based on an elemental sulfur cathode active material conductive additives are included as a component of the active material composition.

The second challenge is to control the diffusion and subsequent loss of polysulfide intermediates formed during cycling. During discharge, sulfur reduces in a stepwise manner by forming a series of polysulfide intermediates which are ionic in nature, solvate easily in the electrolyte and do not return to the cathode during the charge cycle. This causes mass loss of active material upon cycling.

To date the technical approaches taken to address and solve these two fundamental challenges have resulted in diminished charge capacity in comparison to the theoretical value of sulfur such that the desired battery performance is not obtained.

Thus, the result of adding high loadings of conductive additives to improve the overall electronic conductivity is low sulfur content in the cathode and corresponding reduction of energy capacity. A second problem is the slow rate of operation due to the low electronic conductivity of sulfur and the low ionic conductivity of the reduced product, $Li_2S$. Third, the diffusion of ionic polysulfides limits cycle life due to anode passivation and mass loss from the cathode.

Extensive research efforts have been devoted to developing methods to enhance the conductivity of elemental sulfur and to control the diffusion of polysulfide intermediates formed during cycling. Conductive hosts infused with sulfur and polymer-coated sulfur composites have been studied since Nazar demonstrated infusion of sulfur into ordered mesoporous carbon. Various micro/nano carbon hosts including spheres, nanofibers, graphene oxide and carbon paper, have been investigated as conductive hosts to contain the sulfur active material (Nazar et al. Nature Materials, 2009, 8, 500-506). A microporous carbon interlayer with pore sizes matching the dimensions of the polysulfide ions has been described (Manthiram et al. Nature Communications, 2012, 3, 1166). Sulfur has also been infused into metal organic frameworks (MOF) in order to improve conductivity by interaction between the polysulfides and the MOF oxide surface (Tarascon et al. Journal of the American Chemical Society, 2011, 133, 16154-16160). Although these systems have shown some improvement in the conductivity of the sulfur cathode, diffusion of polysulfides out of the host pores continues to be a problem and limited cycle life results. Further, because a carbon matrix is employed to enhance conductivity of the sulfur the capacity of the cathode is decreased due to dilution of the sulfur density in the cathode active material.

In U.S. application Ser. No. 14/489,597, filed Sep. 18, 2014, the present research group has described encapsulated sub-micron sulfur particles formed in the presence of a mixed hydrophilic/hydrophobic copolymer. The resulting encapsulated sulfur sub-micron core particle is coated with a membrane of layers of self-assembling conductive polymer layers, each successive layer having a charge opposite to the previous layer. Carbon black functionalized as described in U.S. Ser. No. 14/985,170, filed Dec. 30, 2015, may be dispersed in the sulfur core or associated with an outermost conductive polymer layer. However, the special functionalization of the carbon requires extra processing and involves the use of toxic and corrosive chemicals.

In U.S. Ser. No. 14/983,763, filed Dec. 30, 2015, the present research group described a sulfur active material of a hybrid particle having a core of a hybrid composite comprising at least two elements selected from sulfur, selenium and tellurium; and a coating of at least one self-assembling polymeric layer encapsulating the core. Further, in U.S. Ser. No. 15/339,224, filed Oct. 31, 2016, sulfur particles having a core of elemental sulfur comprising homogeneously dispersed particles of a conductive carbon and branched polyethyleneimine and a coating of branched polyethyleneimine (bPEI) encapsulating the core were described.

Although each of the above applications described sulfur active materials having incremental improvement in capacity and cycle lifetime, significantly greater improvement in areal loading capability and stabilization of the elemental sulfur to polysulfide loss is necessary in order to produce commercially viable metal-sulfur batteries.

Conventionally, the sulfur cathodes as described above operate at sulfur loadings of about 1 $mg/cm^2$ and capacities greater than 1000 mAh/g are not obtained.

Thus, there is a need for a sulfur active material which allows for complete utilization of sulfur at high loadings, i.e., greater than 1 mg per cm² and a low to no loss of polysulfide while having a balance of high capacity and good conductivity.

An object of the present disclosure is to provide an elemental sulfur composite suitable for utilization as a cathode active material which is capable of high sulfur loading and is stabilized to polysulfide loss.

A second object of the present disclosure is to provide a cathode containing an active material which allows for high sulfur loading and utilization and is suitable for utility in a battery having high capacity and high cycle lifetime.

A third object of the disclosure is to provide a metal sulfur battery which has sufficient capacity and lifetime to be a viable commercial energy source for automobiles and electronic devices.

SUMMARY OF THE DISCLOSURE

These and other objects have been achieved by the present disclosure, the first embodiment of which includes a core-shell composite sulfur particle, comprising:

a core of elemental sulfur comprising homogeneously dispersed particles of a conductive carbon and a polyelectrolyte polymer; and a shell of a hybrid membrane comprising in sequence from the surface of the core, a layer of branched polyethyleneimine (bPEI), a layer of a negatively charged clay nano sheet and a layer of bPEI on the layer of charged clay nanosheet encapsulating the core;

wherein the dispersed particles of conductive carbon are associated with the polyelectrolyte polymer of the elemental sulfur core.

In an aspect of the first embodiment, the hybrid membrane further comprises in sequence from the layer of bPEI on the layer of charged clay nanosheet at least one additional sequence of a layer of charged clay nano sheet and a layer of bPEI on the layer of charged clay nanosheet.

In an aspect of the first embodiment, the polyelectrolyte polymer of the core is selected from the group consisting of a branched polyethyleneimine, a poly(3,4-ethylenedioxythiophene) polystyrene sulfonate (PEDOT:PSS) and a polyvinyl pyrrolidone (PVP).

In an aspect of the first embodiment, the negatively charged clay is at least one of a Montmorillonite and a modified montmorillonite (Cloisite®).

In a second embodiment, the present disclosure includes a method for preparing the core-shell composite sulfur particle of the first embodiment, comprising: mixing the conductive carbon in water with the polyelectrolyte polymer; mechanically dispersing the conductive carbon in association with the polyelectrolyte polymer; preparing a precursor aqueous solution of at least one of a thiosulfate and a polysulfide; adding an acid to the precursor aqueous solution to precipitate nanoparticles of elemental sulfur in the presence of the dispersed conductive carbon associated with the polyelectrolyte polymer to obtain the elemental sulfur core as a precipitated particle in an aqueous mother liquor; removing the mother from the precipitated particle; washing the precipitated particle with water; suspending the washed precipitated sulfur core particle in water; and coating the washed precipitated sulfur core particle with the sequence of bPEI layer, negatively charged clay layer and bPEI layer in a layer-by-layer (LBL) coating method; wherein the dispersed conductive carbon associated with the polyelectrolyte polymer is mixed with the precursor aqueous solution prior to addition of the acid or added to the precursor aqueous solution with the acid.

In a third embodiment, the present disclosure includes a cathode comprising: a conductive substrate and an active material layer on the substrate, comprising: a multiplicity of the core-shell composite sulfur particles of the first embodiment; at least one conductive carbon; and a binder.

In an aspect of the third embodiment a content of the core-shell composite sulfur particles in the active material layer is from 50 to 90% by weight; a content of the binder is from 2 to 10% by weight; and a content of the conductive carbon is from 5 to 40% by weight; wherein the weight % is relative to a total weight of the active material.

In an aspect of the third embodiment a loading of sulfur on the conductive substrate is from 1.0 mg/cm² to 10 mg/cm².

In an aspect of the third embodiment the conductive carbon is at least one selected from the group consisting of carbon black, acetylene black, vapor grown carbon fiber, carbon nanofibers, graphene, natural graphite, artificial graphite, fullerenes, hard carbon, mesocarbon microbeads and activated carbon.

In an aspect of the third embodiment the conductive carbon comprises graphite, carbon black and carbon nanofibers.

In a fourth embodiment, a battery comprising the cathode as described above is provided. In one aspect of this embodiment, the battery is a lithium-sulfur battery.

The present disclosure also includes a vehicle or electronic device containing the battery according to the embodiments of the disclosure.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

DETAILED DESCRIPTION OF THE DISCLOSURE

Figure 1:
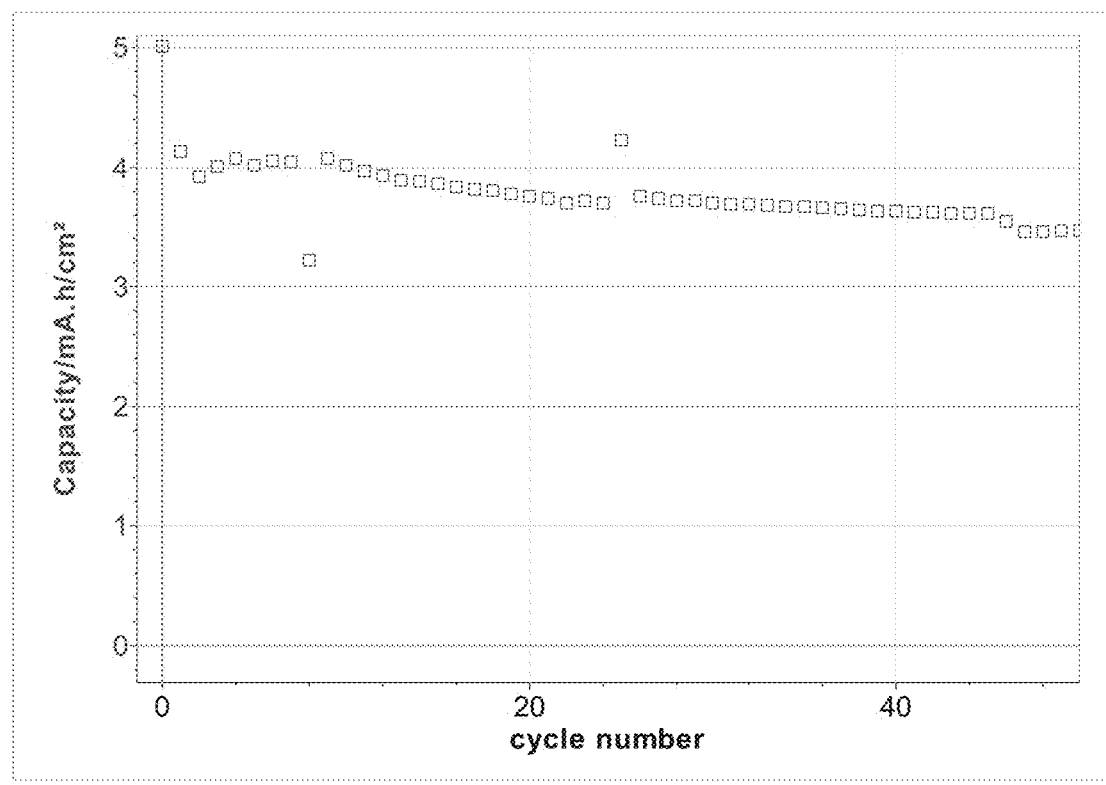
FIG. 1 shows the cycle life of a cathode prepared as described in Example 1.

Within the description of this disclosure, all cited references, patents, applications, publications and articles that are under authorship, joint authorship or ascribed to members of the Assignee organization are incorporated herein by reference. Where a numerical limit or range is stated, the endpoints are included. Also, all values and subranges within a numerical limit or range are specifically included as if explicitly written out. As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. According to the present disclosure, the term "chalcogen core" refers to a core containing elemental sulfur. As used herein, the term "vehicle" refers to any power driven device designed for transportation including an automobile, truck van, bus, golf cart and other utility forms of transportation. All other terms are interpreted according to the conventional meaning understood by one of skill in the art.

As described previously, the inventors are directing effort and resources to the study of materials useful to produce a battery of sufficient capacity and cycle lifetime to be competitive with and replace a combustion engine as a power source as well as other utilities requiring a high capacity, high cycle lifetime battery. In addition, a battery suitable for large scale intermittent energy storage will also be important for storage of green energy such as provided by wind and solar generation methods.

To address the need to increase conductivity of elemental sulfur, methods to form a sub-micron size sulfur core particle as a homogeneous composite of sulfur and a conductive carbon has been discovered and developed as described in this application. Further study to limit the loss of sulfur as polysulfide from the sulfur core has resulted in the surprising discovery of a hybrid membrane structure including nanosheets of a negatively charged clay which significantly retains polysulfide and increases cycle lifetime of a battery containing a cathode having the active material composition described in the present embodiments.

The present inventors have surprisingly discovered that when one or more charged clay nano sheets are included as components of a hybrid membrane which encapsulates a sulfur particle core, a cathode active material wherein polysulfide dissolution into the electrolyte is significantly impeded is obtained. The clay material may be any clay having a negative charge or surface structure which would form associative interaction with a positively charged polyelectrolyte. Montmorillonite and Cloisite® Na are examples of negatively charged sodium salts of clay nano sheets which can be dissolved in water or form suspensions if stirred vigorously. Montmorillonite clay is an example of a smectite clay and other smectites which carry a surface charge include hectorite, beidellite and nontronite. Because they are negatively charged they can be paired with positively charged polyelectrolytes such as branched polyethyleneimine (bPEI) and thus form membranes which have been unexpectedly discovered to be highly non-permeable to polysulfide ions. Gas barrier membranes containing clay nanosheets have been described (for example, see Grunlan et al. ACS Appl. Mater. Interfaces, 2014, 6, 6040-6048). However, the inventors are not aware of any previous application of hybrid membranes containing a layer of hybrid clay nanosheets to encapsulate sub-micron sulfur particles for utility as an electrode active material.

Thus, in a first embodiment the present invention provides a core-shell composite sulfur particle, comprising: a core of elemental sulfur comprising homogeneously dispersed particles of a conductive carbon and a polyelectrolyte polymer; and a shell of a hybrid membrane comprising in sequence from the surface of the core, a layer of branched polyethyleneimine (bPEI), a layer of a negatively charged clay nano sheet and a layer of bPEI on the layer of charged clay nanosheet encapsulating the core. The dispersed particles of conductive carbon are associated with the polyelectrolyte polymer of the elemental sulfur core.

The inventors have determined that the conductivity of the sulfur core may be most efficiently and effectively increased by having particles of conductive carbon homogeneously dispersed within the sulfur. The core conductive carbon may be any conventionally known form of conductive carbon. Preferably the core conductive carbon may be selected from the group consisting of carbon black, acetylene black, graphene, natural graphite, artificial graphite, fullerenes, hard carbon, mesocarbon microbeads and activated carbon. Most preferably the core conductive carbon may be a carbon black.

The content of the conductive carbon in the elemental sulfur core in the form of polyelectrolyte polymer conductive carbon associated particles is from 0.01 to 1.0% by weight of a total weight of the elemental sulfur core, preferably 0.25 to 0.75% by weight and most preferably 0.4 to 0.6% by weight.

The polyelectrolyte polymer may be one or more of a branched polyethyleneimine (bPEI), a poly(3,4-ethylenedioxythiophene) polystyrene sulfonate (PEDOT:PSS) and a polyvinyl pyrrolidone (PVP).

Branched polyethyleneimine (bPEI) may be represented by the following formula:

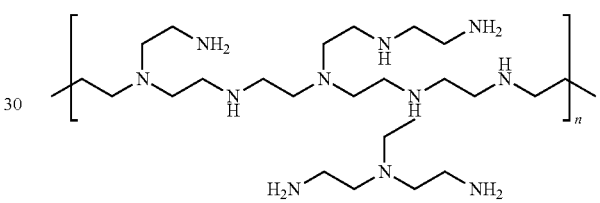

wherein under acid conditions the amino groups carry a degree of positive charge. Conductive carbon particles may be mechanically dispersed in an aqueous medium with mechanical or other high energy agitation such as sonication. Under the effect of this treatment, the conductive carbon particles become associated with the polyelectrolyte polymer in such a manner that the Inventors consider the carbon particles are functionalized according to the chemical character of the polyelectrolyte.

Thus, in the case of a polyelectrolyte such as bPEI or PVP as the pH of the aqueous medium is lowered, the positive charge density of the conductive carbon particles will increase to eventual saturation of free amino groups of the polyelectrolyte at low ph.

The degree of association or functionalization may be monitored by measurement of the zeta potential of the conductive carbon particles obtained. For example, the inventors have discovered that to obtain good aqueous dispersion of the conductive carbon particles associated with bPEI in the precipitated sulfur particles, the zeta potential of the bPEI-conductive carbon associative particles must be −35 mV or less, preferably −38 mV or less and most preferably −40 mV or less.

As will be described in the method to manufacture the core-shell composite sulfur particles of the first embodiment, the sulfur core is obtained by acid precipitation of the elemental sulfur in the presence of the conductive carbon functionalized with the polyelectrolyte polymer. The diameter of the precipitated elemental sulfur core having the homogeneously dispersed functionalized conductive carbon may be from 200 to 1,000 nm depending on actual conditions of the precipitation method.

The number of alternating layers of bPEI and negative clay nanosheets may be varied depending on the properties of the core-shell composite sulfur particle to be obtained and the hybrid membrane may further comprises in sequence from the layer of bPEI on the layer of charged clay nanosheet at least one additional sequence of a layer of charged clay nano sheet and a layer of bPEI on the layer of charged clay nanosheet. The total number of additional sequences of a layer of charged clay nano sheet and a layer of bPEI may be from 2 to 10, preferably from 2 to 6 and most preferably from 2 to 4 additional sequences. In one aspect the membrane may contain a total of five layers. Although not intended to be a limiting element, the core-shell composite sulfur particles are generally spherical particles having a diameter of 1 micron or less.

The hybrid membrane may be structured such that a layer of bPEI is in direct contact with the surface of the sulfur core and an outermost layer of the membrane is also a layer of bPEI. The bPEI inner layer on the sulfur core surface is electrostatically associated to the sulfur surface and provides a positive charged layer to electrostatically attract the negative clay sheets. The outermost bPEI surface favorably interacts with the conductive carbon added to the composition of the cathode active material described later.

In a second embodiment, a method to prepare the core-shell composite sulfur particle of the first embodiment is provided. The method comprises: mixing the conductive carbon in water with the polyelectrolyte polymer; mechanically dispersing the conductive carbon in association with the polyelectrolyte polymer; preparing a precursor aqueous solution of at least one of a thiosulfate and a polysulfide; adding an acid to the precursor aqueous solution to precipitate elemental sulfur in the presence of the dispersed conductive carbon associated with the polyelectrolyte polymer to obtain the elemental sulfur core as a precipitated particle in an aqueous mother liquor. The dispersed conductive carbon associated with the polyelectrolyte polymer is mixed with the precursor aqueous solution prior to addition of the acid or added to the precursor aqueous solution with the acid. The mother liquor may then be removed from the precipitated particle; the precipitated particle washed with water and then suspended in water for coating the washed precipitated sulfur core particle with the sequence of a bPEI layer, a negatively charged clay layer and a bPEI layer in a layer-by-layer (LBL) coating method.

Thus, according to the method of manufacture described in the embodiments herein, elemental sulfur is formed and precipitated from a thiosulfate or polysulfide solution by addition of one or more acids in the presence of polyelectrolyte polymer and conductive carbon particles associated with the polyelectrolyte polymer. Although any acid may be suitable, preferred acids may include organic acids selected from oxalic acid, malic acid, succinic acid, glutaric acid, adipic acid and ascorbic acid.

The inventors have determined that when one of the above listed organic acids is employed as the precipitation agent, generally smaller elemental sulfur particles are obtained compared to the particles obtained with strong inorganic particles. The diameter of the sulfur particles may be varied from 200 to 1,000 nm depending on precipitation conditions and acid employed.

Although not wishing to be bound by theory, the inventors believe formation and precipitation of the sulfur particles in the presence of the polyelectrolyte polymer-conductive carbon associated particles provides the particles of the first embodiment where the conductive carbon associated particles (also referred to as functionalized particles) are homogeneously dispersed in the precipitated sulfur core which is then coated with the inner layer of bPEI.

In an aspect where the polyelectrolyte polymer is bPEI it may be advantageous to conduct the precipitation in a higher weight % of bPEI such that a layer of bPEI forms on the precipitated sulfur core particle as the precipitation proceeds.

According to this aspect, as the weight % content of the bPEI-conductive carbon associated particles is increased in the precipitation medium the bPEI-conductive carbon associated particles may become part of the coating of the sulfur particle and may decorate the exterior coating layer.

As described above the elemental sulfur particles may be formed from the reaction of sodium thiosulfate with an acid, such as oxalic acid, and one possible reaction equation to describe this process may be:

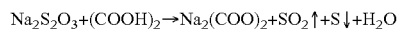

$$Na_2S_2O_3 + (COOH)_2 \rightarrow Na_2(COO)_2 + SO_2\uparrow + S\downarrow + H_2O$$

In specific aspects, the elemental sulfur particles obtained may have a sulfur content greater than 95% by weight depending on the amounts of polyelectrolyte polymer-conductive carbon associated particles.

The disclosure is not limited to the particular chemistry described and any method to form and precipitate elemental sulfur in the presence of polyelectrolyte polymer-conductive carbon associated particles may be suitable.

Layer-by-layer assembly is generally conventionally known. For example see Muldoon et al. (Energy Environ. Sci., 2016, 9, 1668-1673). According to the present embodiment, the LBL coating method for coating a core particle having an elemental sulfur surface comprises: preparing a first coating suspension by dissolving an inorganic salt in the suspension of the washed precipitated sulfur core particle; adding bPEI to the first coating suspension to obtain a first coating mixture; mixing the first coating mixture to coat the suspended sulfur core particle with a layer of bPEI; removing the bPEI mother liquor from the first coating mixture to obtain a bPEI coated sulfur composite particle; applying a coating of the negatively charged clay on the bPEI layer by suspending the bPEI coated sulfur composite particle in deionized water to obtain a second coating suspension; dissolving an inorganic salt in the second coating suspension; adding the negatively charged clay to the second coating suspension to obtain a second coating mixture; mixing the second coating mixture to coat the bPEI layer of the bPEI coated sulfur composite particle with a layer of a negatively charged clay nano sheet; removing the negatively charged clay mother liquor from the second coating mixture to obtain a coated sulfur composite particle having a first layer of bPEI on the surface of the sulfur core and a layer of negatively charged clay nanosheet on the first layer of bPEI; suspending the coated sulfur composite particle having a first layer of bPEI on the surface of the sulfur core and a layer of negatively charged clay nanosheet on the first layer of bPEI in water to obtain a third coating suspension; dissolving an inorganic salt in the third coating suspension; adding bPEI to the third coating suspension having the dissolved inorganic salt to obtain a third coating mixture; mixing the third coating mixture to coat the coated sulfur composite particle having a first layer of bPEI on the surface of the sulfur core and a layer of negatively charged clay nanosheet on the first layer of bPEI with a layer of bPEI on the layer of negatively charged clay nanosheet; removing the bPEI mother liquor from the third coating mixture to obtain the core-shell sulfur composite particle.

The LBL coating process may be repeated from 2 to 8 times to obtain a shell structure comprising multiple alternate layers of bPEI and negatively charged clay nanosheets according to the number of times the LBL coating process is completed. The LBL process may be varied as understood by one of skill in the art. However, the method to prepare the hybrid membrane encapsulating the precipitated sulfur core particle may be structured such that an inner layer on and directly associating with the sulfur surface is a layer of bPEI. Further as previously described, the outermost layer may also be a bPEI layer.

The inorganic salt added to the coating mixtures may be any suitable water soluble electrolyte and may be added to a concentration of from 0.05 to 0.25M. The inorganic may suitable be the salt of the cation form of the metal to be employed in the anode of a battery. For example if the core-shell composite sulfur particle is intended as a cathode active material for a lithium sulfur battery a lithium salt such as for example, lithium nitrate may be employed.

In a third embodiment, the present disclosure provides a cathode containing a conductive substrate, and an active material layer on the substrate, comprising: a multiplicity of core-shell composite sulfur particles of the first embodiment; at least one conductive carbon; and a binder. In a more explicit aspect of the third embodiment a content of the core-shell composite sulfur particles in the active material layer is from 50 to 90% by weight; a content of the binder is from 2 to 10% by weight; and a content of the conductive carbon is from 5 to 40% by weight; wherein the weight % is relative to a total weight of the active material. The content of the core-shell composite sulfur particles in the active material layer may preferably be from 55 to 85% by weight and most preferably from 60 to 80% by weight. The content of the conductive carbon may preferably be from 10 to 30% by weight and most preferably from 12 to 30% by weight.

Suitable binders known to one of ordinary skill which are chemically stable in the potential window of use of the cell may include thermoplastics and thermosetting resins. For example, polyethylene, polypropylene, polytetrafluoroethylene (PTFE), polyvinylidene fluoride (PVDF), styrene butadiene rubber, a tetrafluoroethylene hexafluoro ethylene copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE). Additionally, water soluble binders including branched polyethyleneimine (bPEI), an ethylene-acrylic acid copolymer such as poly 2-acrylamido-2-methylpropane sulfonic acid (PAMPS) and Nafion may be employed as binder. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper. The areal amount of active ingredient, binder and conductive agent may be controlled by choice of draw bar or doctor blade selection. The applied material may then be pressed to a set thickness.

The conductive carbon material may be carbon black, such as Ketjenblack®, Super P® Li, Timcal® Super C65, Ensaco® black and acetylene black, vapor grown carbon fiber, graphene, natural graphite, artificial graphite, such as Timrex® SFG-6, Timrex® SFG-15, Timrex® SFG-44, Timrex® KS-6, Timrex® KS-15 and Timrex® KS-44, fullerenes, hard carbon, mesocarbon microbeads, carbon nanofibers and activated carbon.

The cathode may be prepared by mixing the particles according to the above description with one or more binders and other materials conventionally employed to prepare a cathode structure. These materials may be mixed as a slurry, coated onto a metal foil, and dried. The methods of construction of a cathode employing an active material are conventionally known and any such method that is compatible with the particles of the disclosure may be employed.

The inventors have surprisingly discovered that cathodes having significantly higher areal loadings of elemental sulfur than conventionally employed may be prepared with the sulfur particles of the first embodiment. Thus, a cathode according to this embodiment may have a sulfur loading of from 1.0 mg S/$cm^2$ to 10 mg/$cm^2$, preferably 2.0 mg/$cm^2$ to 8.0 mg/$cm^2$ and most preferably, 3.0 mg/$cm^2$ to 6 mg/$cm^2$.

Cathode active material compositions containing the core-shell composite sulfur particles in excess of 50% mixed with particulate and tubular conductive carbons make slurries with better homogeneity and adhesive nature when prepared in aqueous solvents rather than the conventional organic solvents such as N-methylpyrrolidone (NMP). Although not wishing to be bound by theory, the inventors believe this observation may be due to the better swelling/plasticization of the hybrid membrane covering the precipitated sulfur particles with aqueous solvents. The polymeric/inorganic building blocks of the hybrid membrane suspend very well in water and are in fact charged salts. Several binders which are soluble in aqueous mixtures such as branched polyethyleneimine (PEI), poly 2-acrylamido-2-methylpropane sulfonic acid (PAMPS) and Nafion® have been investigated as binders. Nafion® is a tradename for sulfonated tetrafluoroethylene based fluoropolymer-copolymers which are commercially available. Specific effects were clearer when high binder ratios were used in the cathode (10% for example) but become less noticeable as the binder content is reduced below 5%. However, due to the high content of small particulate carbons (SuperP® Li) and the high general surface area of sub-micron sized active material, it is difficult to prepare a cohesive electrode slurry with less than 5% binder.

Figure 4:
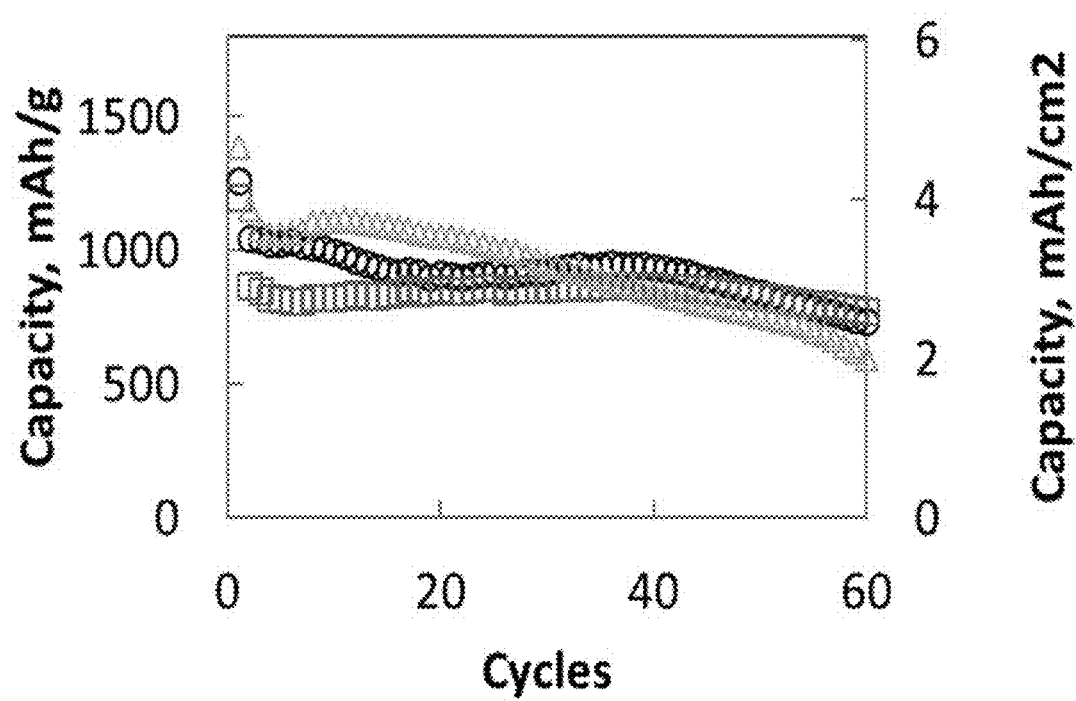
FIG. 4 shows the effect of binder on cycling of lithium-sulfur coin cells with an electrode having a ratio of active material/carbon/binder of 65/25/10.

Cycling of lithium-sulfur coin cells where the cathode content ratio is 65/25/10 and the binder varies between Nafion® (triangles), branched PEI (circles) and PAMPS (squares) is shown in FIG. 4. The operating rate was 1 mA/cm2 with full discharge in approximately 4 hours. Surprisingly Nafion® performs well as a binder possibly due to its high conductivity for monovalent ions such as $Li^+$.

Figure 5:
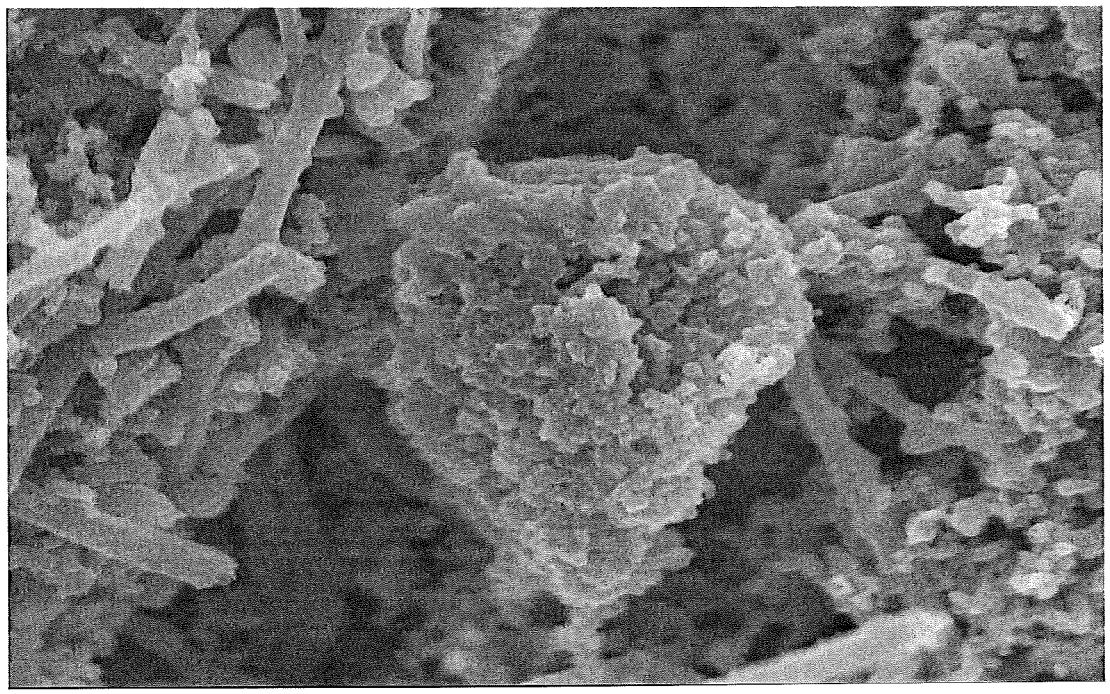
FIG. 5 shows the adsorption of SuperPLi onto the hybrid membrane of the core-shell sulfur composite particle as well as the long reach of the carbon nano fibers.

While the choice of binder may be important for electrodes which require a high binder content, the inventors have determined that performance of the lithium sulfur battery may be significantly improved even more from the careful selection of the conductive carbon component of the cathode active material composition. The inventors have discovered that when a 1:1 mixture of SuperP® Li and carbon nanofibers (CNF) were ball milled with the other active material components with low energy (~100 rpm with small beads) high capacities may be extracted from the core-shell composite sulfur particle active material, far in excess of the capacities extracted with SuperPLi or CNF alone. Again, not wishing to be bound by theory, this may be attributed to the sticky hybrid membrane which adheres strongly onto the SuperPLi and becomes tightly covered by it (FIG. 5). It is noted that SuperP® Li is a mixture of graphite and carbon black (TIMCAL® Graphite and Carbon Super P Conductive Carbon Black). In this case, the SuperPLi particles cannot orient themselves to form long and malleable "wires" as they do when mixed with the typical Li-ion cathode material. In effect, SuperPLi here becomes "glued" to the active material particle outer surface, however, the cathode still requires long distance electron carriers. To this effect the long carbon nanofibers which can span in excess of 10 μm in length were employed. This symbiotic role of the three carbon components (graphite, conductive carbon black and carbon nanowires) may be critical to extracting full capacity out of the core-shell sulfur composite particles of the embodiments described in this application.

The cathode thus prepared may be employed in the construction of an electrochemical cell or battery in a conventionally known manner. In a preferred embodiment the cathode may be combined with an anode having a metal as an active material. The metal may be an alkali metal including lithium or sodium or an alkaline earth metal including magnesium.

In a fourth embodiment the present disclosure provides a battery comprising a metal anode, an electrolyte and a cathode comprising the hybrid particles according to the present disclosure. The metal may be selected from the alkali metals, alkaline earth metals or other metals suitable for utility in metal ion batteries. In a preferred aspect, the metal of the anode may be lithium.

Nonaqueous solvents suitable as an electrolyte include cyclic carbonates, chain carbonates, cyclic esters, cyclic ethers and chain ethers. Examples of a cyclic carbonate include ethylene carbonate, propylene carbonate, butylene carbonate and vinylene carbonate. Examples of a chain carbonate include dimethyl carbonate, diethyl carbonate and methyl ethyl carbonate. Examples of a cyclic ester carbonate include gamma butyrolactone and gamma valerolactone. Examples of a cyclic ether include tetrahydrofuran and 2-methyltetrahydrofuran. Examples of a chain ether include dimethoxyethane and ethylene glycol dimethyl ether.

When the battery is a lithium ion battery the lithium electrolyte ion or mobile ion carrier may be any conventionally known to one of skill in the art and may include one or more of $LiPF_6$, $LiClO_4$, $LiAsF_6$, $LiBF_4$, $LiN(CF_3SO_2)_2$, $Li(CF_3SO_3)$ and $LiN(C_2F_5SO_2)_2$.

In another aspect of the fourth embodiment a lithium-sulfur battery having a loading of sulfur on the cathode from 1.0 mg S/cm$^2$ to 10 mg/cm$^2$ is provided. In a further special aspect, a lithium-sulfur battery having a loading of sulfur on the cathode from 2.0 mg/cm$^2$ to 8 mg/cm$^2$ preferably from 3.0 mg S/cm$^2$ to 6 mg/cm$^2$ is provided.

In further embodiments the present disclosure includes a vehicle containing the battery according to the present disclosure wherein the vehicle includes an automobile, truck van, bus, golf cart and other utility forms of transportation.

Having generally described this disclosure, a further understanding can be obtained by reference to certain specific examples which are provided herein for purposes of illustration only and are not intended to be limiting unless otherwise specified.

EXAMPLES

Example 1

Figure 2A:
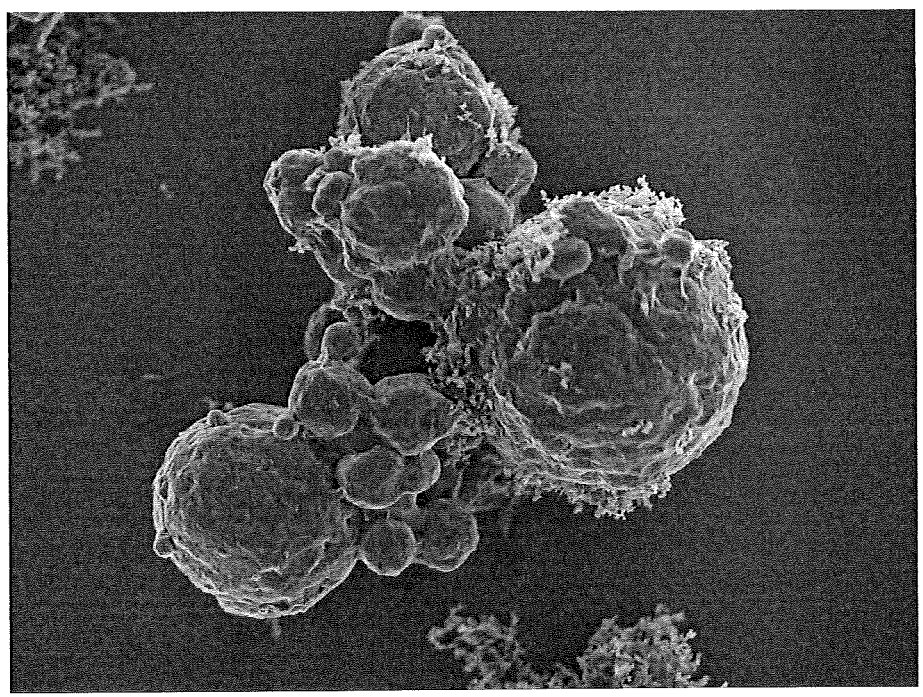
FIG. 2A shows a SEM image of core-shell sulfur composite particles (×9000) according to the first embodiment.
Figure 2B:
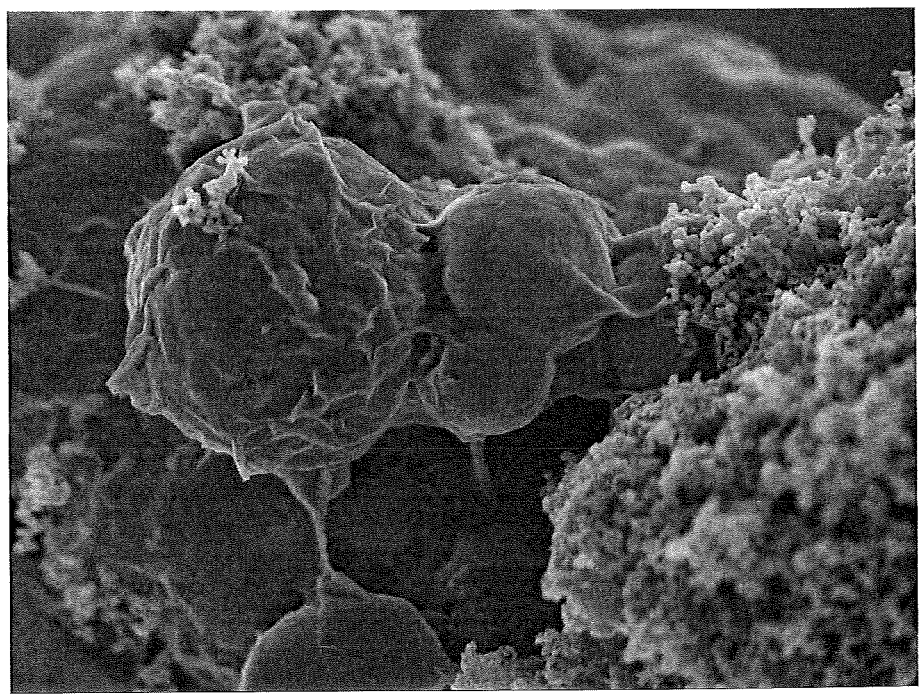
FIG. 2B shows a SEM image of core-shell sulfur composite particles (×30,000) according to the first embodiment.

200 g of potassium polysulfides were dissolved in 3.5 L of water. 4 g of Ketjenblack® 600JD and 1 g bPEI, MW 750,000 were added to the solution. After strong mechanical mixing of the mixture, 150 ml concentrated HCl was added slowly and allowed to react for approximately 2 hours. The precipitated sulfur particles were separated and reslurried in water to prepare a hybrid membrane. Using layer-by-layer technique, 5 layers were applied to the precipitated scaffold sulfur particle obtained. Cloisite® Na and bPEI layers were added sequentially beginning with a layer of bPEI from solutions of 1 g Cloisite® Na or 1 g BPEI dissolved in 1.5 L water. After each layer deposition, the material is rinsed in water and centrifuged for collection then layered again. A total of 5 layers were deposited in this manner. The resulting material consisted of spherical particles less than 1 um in diameter. The particles were well coated by the clay containing membrane and did not exhibit pinholes which are often observed when only polymers are used for the layer by layer membrane assembly (see FIGS. 2A and 2B). The resulting core-shell composite sulfur particles contained from 85-90% sulfur by weight as measured by TGA analysis.

Cathodes containing 65% of the core-shell composite sulfur particles, 25% carbon and 10% PVDF binder were prepared by pre-ball-mill mixing (low rpm, ~100) of the active material with carbon, followed by pestle and mortar mixing with the binder and finally rotary "thinky" mixing by adding solvent to the desired viscosity for blade casting. These cathodes provided sulfur loading per area, as high as 10 mg S/cm$^2$ with thicknesses below 150 um and a typical capacity between 900 and 1100 mAh/g sulfur. This corresponds to an observed areal capacity in excess of 5 mAh/cm$^2$ which is roughly double that of currently commercial lithium ion batteries. A 10-20% drop in capacity was typical between the first and 2$^{nd}$ cycle, after which the capacity was stable often in excess of 50 cycles. Cathodes with higher ratio of active material can also be cycled. 90% active material cathodes cycle close to 100 times with areal capacities higher than 3.5 mAh/cm$^2$. This significantly higher sulfur loading is unparalleled in the lithium-sulfur field at this point in time. 210 ul of electrolyte were used in thick 2 mm fiberglass separators for an active cathode area of 1.911 cm2.

FIG. 1 shows the cycle life of a cathode containing 90% by weight of the core-shell composite sulfur particles with 87% sulfur content, 5% carbon nanofibers as conductive additive and 5% PVDF binder. 75% of original capacity was still available after 75 cycles.

FIG. 2 shows SEM pictures of the active material. The inorganic clay membrane component confers a tightly packed, impermeable characteristic and encloses the core sulfur particle well, without pin holes which is important for reducing the loss of polysulfide intermediates. The small dots are SuperPLi conductive carbon additive.

Figure 3:
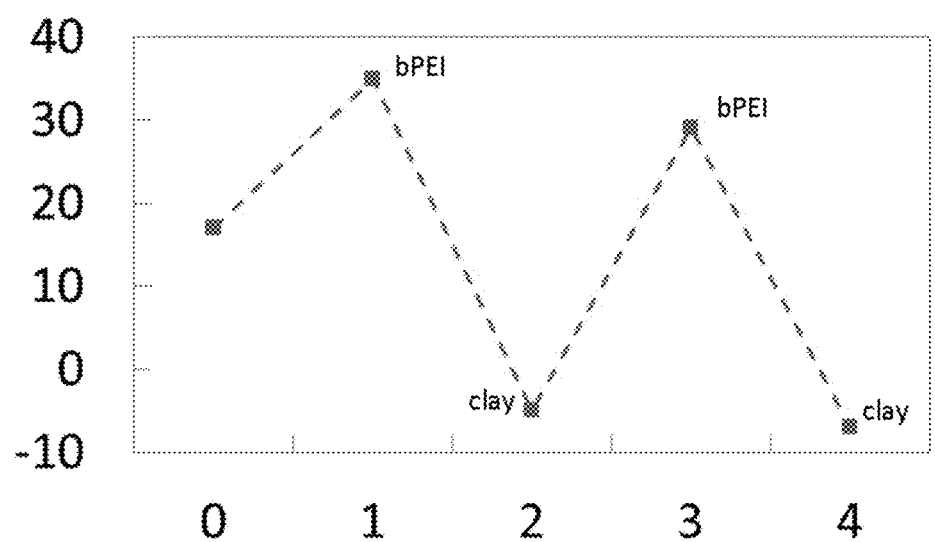
FIG. 3 shows the change in surface Zeta potential as alternating layers of bPEI and negative clay nanosheets are applied to the composite sulfur particle surface.

FIG. 3 shows the Zeta potential switch obtained in the LBL process where the surface charge of the sulfur particle switches from positive to negative as a positive layer is adsorbed to the membrane (bPEI), followed by a negative layer (clay).

Example 2

200 g of potassium polysulfides from Sigma Aldrich were dissolved in 1.5 liters of deionized water and mixed with 1 g branched PEI (75 k MW) and 2 g Ketjen Black 600JD from Azko Nobel yielding a black solution. A clear solution of 400 g ascorbic acid dissolved in 2 liters deionized water was slowly added to this mixture. The color of the reaction mixture changed during addition from dark black to slightly yellow, then bright yellow, followed by gradual darkening to a dark soft grey/blue. The reaction was allowed to proceed for 4 hours after which it was centrifuged (~800 rpm) and rinsed once in 1 liter deionized water.

Layer by Layer Coating of the Particle 5 layers of branched PEI/Cloisite a clay were adhered to the particle to yield the finished core-shell composite sulfur particle. Branched PEI (75 k MW) was added first and last. Each layer addition was performed by suspending the particle mass in 1 liter of deionized water with stirring, adding LiNO$_3$ to obtain a 0.1M concentration and then adding 1 g branched PEI or 1 g Cloisite® Na clay as needed to build the layer to layer membrane. Each layer solution was allowed to mix for 1 hour. One rinse in 1 liter deionized water after each layer ensured the removal of excess, unabsorbed material. The product was then dried in the oven, under vacuum at 80 degrees Celsius as needed to dry (1-2 days), followed by TGA analysis to determine the sulfur content (typically 85%-90%).

Cathode Powder Preparation

The dry active material was ground with a pestle and mortar and mixed with a 1:1 ratio of SuperP® Li and carbon nanofibers and dry ball milled with small beads at low energy (~100 rpm) for 2 hours. This step ensured the adhering of the SuperP® Li dots to the core-shell composite sulfur particle membrane with long range connections supplied by the carbon nanofibers. For example, 0.3 g active material was mixed with 0.0974 g SuperP® Li and 0.0974 g carbon nanofibers (ratio of 57/37/6 of active material/carbon/binder). 40 g small beads were added to the ball mill cup.

Cathode Slurry Preparation

A small ratio (1-10%) of a binder such as Nafion® was mixed well with the cathode powder described above. The mixing was done with the pestle and mortar. Water was used to make the slurry which was further mixed by a Thinky mixer at 2000 rpm. In one example, 0.632 ml of a 5% Nafion® solution was added to the active material/carbon mixture described above in a mortar. 1 additional ml of water was added and mixed well with the pestle to form a thick paste which was then transferred (scooped) to a 9 ml Teflon Thinky cup. An additional 3 ml water were added and then the slurry was mixed for 10 minutes at 2000 rpm in the Thinky mixer.

Slurry Casting/Calendaring on Aluminum Foil

The slurry was poured/scooped onto aluminum foil and cast with 1000 μm wet gap. The casting was then dried in vacuum oven at 80 degrees Celsius for at least 4 hours. The dry cathode was then calendared down to 85 μm in thickness.

Coin Cell Preparation

Disks with an area of 2.835 cm$^2$ were stamped out, weighed and placed on the bottom can of the coin cell inside the glovebox. A thick, fiber glass separator BGO21565 or BGO28065 from Hollingsworth & Vose was placed on top then 0.21 ml electrolyte was pipetted into the separator. A pre-conditioned lithium disk (1.91 cm$^2$) was placed on top, followed by a 0.5 mm spacer, a spring and the top cover. The coin cell was then crimped and tested. No electrolyte leaked out in this procedure. The sulfur cathode area was in excess in order to determine the minimum volume of electrolyte needed to extract full capacity. A typical open circuit potential of 2.8V to 3.1V was observed with an impedance below 50 G. Capacities were calculated based on the mass of sulfur directly opposite the limiting area of the lithium metal anode (1.911 cm$^2$).

Pre-Conditioning of the Lithium Metal Foil

In a glovebox, 1 mmol (0.0459 g) Li$_2$S was mixed with 0.625 mmol (0.1603 g) S$_8$ (elemental sulfur) in 20 ml of a 1:1 solvent mixture of glyme and dioxolane (DME:DOL) according to the following reaction:

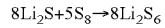

$$8Li_2S + 5S_8 \rightarrow 8Li_2S_6$$

The expected product was an approximately 0.05 M lithium polysulfide mixture. This was allowed to react with vigorous stirring at room temperature overnight (inside the glovebox). It took several hours for the reaction to start producing the brown polysulfide color. A freshly scraped lithium disk was immersed in about 0.5 ml of the polysulfide solution for at least 1 hour and no longer than 1 week. The treated lithium disk was rinsed with THF, glyme or dioxolane as needed to remove polysulfide solution and then allowed to dry (~2-5 minutes) before use in the coin cell assembly.

The invention claimed is:

1. A core-shell composite sulfur particle, comprising:
   a core of elemental sulfur comprising homogeneously dispersed particles of a conductive carbon and a polyelectrolyte polymer; and
   a shell of a hybrid membrane comprising in sequence from a surface of the core, a layer of branched polyethyleneimine (bPEI), a layer of a negatively charged smectite clay nanosheet and a layer of bPEI on the layer of negatively charged smectite clay nanosheet encapsulating the core;
   wherein the dispersed particles of conductive carbon are associated with the polyelectrolyte polymer of the elemental sulfur core, and
   the polyelectrolyte polymer of the core is selected from the group consisting of a branched polyethyleneimine, poly(3,4-ethylenedioxythiophene) polystyrene sulfonate (PEDOT:PSS) and polyvinyl pyrrolidone (PVP).

2. The core-shell composite sulfur particle of claim 1, wherein the hybrid membrane further comprises in sequence from the layer of bPEI on the layer of negatively charged smectite clay nanosheet at least one additional sequence of a layer of negatively charged smectite clay nano sheet and a layer of bPEI on the layer of negatively charged smectite clay nanosheet.

3. The core-shell composite sulfur particle of claim 2, wherein a number of additional sequences of a layer of negatively charged smectite clay nano sheet and a layer of bPEI is from 2 to 10.

4. The core-shell composite sulfur particle of claim 1, wherein the negatively charged smectite clay is at least one of Montmorillonite, a modified Montmorillonite, hectorite, beidellite and nontronite.

5. The core-shell composite sulfur particle of claim 1, wherein a content of the conductive carbon in the elemental sulfur core is from 0.01 to 1.0% by weight of a total weight of the elemental sulfur core.

6. The core-shell composite sulfur particle of claim 1 wherein a diameter of the core of elemental sulfur is from 200 to 1,000 nm.

7. The core-shell composite sulfur particle of claim 1 wherein the conductive carbon is a carbon black.

8. A cathode comprising:
   a conductive substrate, and
   an active material layer on the substrate, comprising:
   a multiplicity of core-shell composite sulfur particles of claim 1;
   at least one conductive carbon in addition to the conductive carbon of the core-shell composite sulfur particles; and
   a binder.

9. The cathode of claim 8, wherein
a content of the core-shell composite sulfur particles in the active material layer is from 50 to 90% by weight;
a content of the binder is from 2 to 10% by weight; and
a content of the conductive carbon is from 5 to 40% by weight;
wherein the weight % is relative to a total weight of the active material.

10. The cathode of claim 9, wherein
a loading of sulfur is from 1.0 mg S/cm$^2$ to 10 mg/cm$^2$.

11. The cathode of claim 8, wherein
a loading of sulfur is from 3.0 mg S/cm$^2$ to 6 mg/cm$^2$.

12. The cathode of claim 8 wherein the binder is a sulfonated tetrafluoroethylene based fluoropolymer-copolymer.

13. The cathode of claim 8, wherein the conductive carbon of the active material layer is at least one selected from the group consisting of carbon black, acetylene black, vapor grown carbon fiber, carbon nanofibers, graphene, natural graphite, artificial graphite, fullerenes, hard carbon, mesocarbon microbeads and activated carbon.

14. The cathode of claim 13, wherein the conductive carbon comprises natural graphite or artificial graphite, carbon black and carbon nanofibers.

15. A battery, comprising:
an anode comprising a metal as an active source of metal ions,
an electrolyte; and
the cathode of claim 8.

16. The battery of claim 15, wherein
the metal of the anode is lithium, and
a loading of sulfur on the cathode is from 1.0 mg S/cm$^2$ to 10 mg/cm$^2$.

17. The battery of claim 16, wherein
the conductive carbon of the cathode comprises natural graphite or artificial graphite, carbon black and carbon nanofibers.

18. A method for preparing the core-shell composite sulfur particle of claim 1, comprising:
mixing the conductive carbon in water with the polyelectrolyte polymer;
mechanically dispersing the conductive carbon in association with the polyelectrolyte polymer;
preparing a precursor aqueous solution of at least one of a thiosulfate and a polysulfide;
adding an acid to the precursor aqueous solution to precipitate elemental sulfur in the presence of the dispersed conductive carbon associated with the polyelectrolyte polymer to obtain the elemental sulfur core as a precipitated particle in an aqueous mother liquor;
removing the mother liquor from the precipitated particle;
washing the precipitated particle with water;
suspending the washed precipitated sulfur core particle in water; and
coating the washed precipitated sulfur core particle with the sequence of bPEI layer, negatively charged clay layer and bPEI layer in a layer-by-layer (LBL) coating method;
wherein the dispersed conductive carbon associated with the polyelectrolyte polymer is mixed with the precursor aqueous solution prior to addition of the acid or added to the precursor aqueous solution with the acid, and the polyelectrolyte polymer of the core is selected from the group consisting of a branched polyethyleneimine, poly(3,4-ethylenedioxythiophene) polystyrene sulfonate (PEDOT:PSS) and polyvinyl pyrrolidone (PVP).

19. The method of claim 18, wherein the LBL coating method comprises:
preparing a first coating suspension by dissolving an inorganic salt in the suspension of the washed precipitated sulfur core particle;
adding bPEI to the first coating suspension to obtain a first coating mixture;
mixing the first coating mixture to coat the suspended sulfur core particle with a layer of bPEI;
removing the bPEI mother liquor from the first coating mixture to obtain a bPEI coated sulfur composite particle;
applying a coating of the negatively charged smectite clay on the bPEI layer by suspending the bPEI coated sulfur composite particle in deionized water to obtain a second coating suspension;
dissolving an inorganic salt in the second coating suspension;
adding the negatively charged smectite clay to the second coating suspension to obtain a second coating mixture;
mixing the second coating mixture to coat the bPEI layer of the bPEI coated sulfur composite particle with a layer of the negatively charged smectite clay nano sheet;
removing the negatively charged smectite clay mother liquor from the second coating mixture to obtain a coated sulfur composite particle having a first layer of bPEI on the surface of the sulfur core and a layer of negatively charged smectite clay nanosheet on the first layer of bPEI;
suspending the coated sulfur composite particle having a first layer of bPEI on the surface of the sulfur core and a layer of negatively charged smectite clay nanosheet on the first layer of bPEI in water to obtain a third coating suspension;
dissolving an inorganic salt in the third coating suspension;
adding bPEI to the third coating suspension having the dissolved inorganic salt to obtain a third coating mixture;
mixing the third coating mixture to coat the coated sulfur composite particle having a first layer of bPEI on the surface of the sulfur core and a layer of negatively charged smectite clay nanosheet on the first layer of bPEI with a layer of bPEI on the layer of negatively charged smectite clay nanosheet;
removing the bPEI mother liquor from the third coating mixture to obtain the core-shell sulfur composite particle.

20. The method of claim 18 wherein the LBL coating process is repeated from 2 to 8 times to obtain a shell structure comprising multiple alternate layers of bPEI and negatively charged smectite clay nanosheets according to the number of times the LBL coating process is completed, with the proviso that the outermost layer of the core-shell composite sulfur particle is a layer of bPEI.

* * * * *